(12) United States Patent
Salkintzis et al.

(10) Patent No.: US 12,532,168 B2
(45) Date of Patent: Jan. 20, 2026

(54) DETERMINING AN AUTHENTICATION TYPE

(71) Applicant: Lenovo (Singapore) Pte. Ltd., New Tech Park (SG)

(72) Inventors: Apostolis Salkintzis, Athens (GR); Roozbeh Atarius, La Jolla, CA (US); Andreas Kunz, Ladenburg (DE); Sheeba Backia Mary Baskaran, Friedrichsdorf (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 337 days.

(21) Appl. No.: 18/008,413

(22) PCT Filed: Jun. 3, 2020

(86) PCT No.: PCT/EP2020/065337

§ 371 (c)(1),
(2) Date: Dec. 5, 2022

(87) PCT Pub. No.: WO2021/244737

PCT Pub. Date: Dec. 9, 2021

(65) Prior Publication Data

US 2023/0262455 A1    Aug. 17, 2023

(51) Int. Cl.
*H04W 12/00* (2021.01)
*H04W 12/06* (2021.01)
(Continued)

(52) U.S. Cl.
CPC .......... *H04W 12/06* (2013.01); *H04W 12/72* (2021.01); *H04W 60/00* (2013.01)

(58) Field of Classification Search
CPC ..... H04W 12/06; H04W 12/72; H04W 60/00; H04W 80/02; H04W 12/75; H04L 63/08
See application file for complete search history.

(56) References Cited

U.S. PATENT DOCUMENTS

2019/0335330 A1* 10/2019 Salkintzis ............. H04W 12/72

FOREIGN PATENT DOCUMENTS

WO    2020006515 A1    1/2020

OTHER PUBLICATIONS

3GPP TS 33.501 V16.2.0, 3rd Generation Partnership Project; Technical Specification Group Services and System Aspects; Security architecture and procedures for 5G system (Mar. 27, 2020) (Year: 2020).*

(Continued)

*Primary Examiner* — Amie C. Lin
(74) *Attorney, Agent, or Firm* — Kunzler Bean & Adamson

(57) ABSTRACT

Apparatuses, methods, and systems are disclosed for selecting an authentication type in a 5G network. One apparatus includes a processor and a network interface that receives a first message requesting to register a remote unit to the mobile communication network, where the remote unit is connected to a non-3GPP access network and the remote unit does not support the NAS protocol. The processor determines an authentication request type for the remote unit, where the authentication request type is not based on the NAS protocol. The processor creates a NAS registration message on behalf of the remote unit and sends a second message to an access management function in the mobile communication network, where the second message contains the NAS registration message and the determined authentication request type.

11 Claims, 10 Drawing Sheets

(51) Int. Cl.
H04W 12/72 (2021.01)
H04W 60/00 (2009.01)

(56) References Cited

OTHER PUBLICATIONS

PCT/EP2020/065337, "Notification of Transmittal of the International Search report and the Written Opinion of the International Searching Authority, or the Declaration", International Searching Authority, Feb. 16, 2021, pp. 1-16.

SA WG3, "Rel-16 CRs on Security of 5WWC", 3GPP TSG-SA Meeting #87 SP-200145, Mar. 17-20, 2020, pp. 1-29.

3GPP, "3rd Generation Partnership Project; Technical Specification Group Services and System Aspects; Procedures for the 5G System (5GS); Stage 2 (Release 16)", 3GPP TS 23.502 V16.4.0, Mar. 2020, pp. 1-582.

3GPP, "3rd Generation Partnership Project; Technical Specification Group Core Network and Terminals; Evolved Packet System (EPS); 3GPP EPS AAA interfaces (Release 16)", 3GPP TS 29.273 V16.0.0, Mar. 2020, pp. 1-200.

3GPP, "3rd Generation Partnership Project; Technical Specification Group Services and System Aspects; Security architecture and procedures for 5G system (Release 16)", 3GPP TS 33.501 V16.2.0, Mar. 2020, pp. 1-227.

* cited by examiner

DETERMINING AN AUTHENTICATION TYPE

The subject matter disclosed herein relates generally to determining an authentication type for a remote unit operating in a non-3GPP access network.

BACKGROUND

The following abbreviations and acronyms are herewith defined, at least some of which are referred to within the following description.

Third Generation Partnership Project ("3GPP"), Fifth-Generation Core network ("5GC"), Access and Mobility Management Function ("AMF"), Access Point Name ("APN"), Access Stratum ("AS"), Access Network Information ("ANI"), Application Programing Interface ("API"), Authentication Server Function ("AUSF"), Data Network Name ("DNN"), Downlink ("DL"), Enhanced Mobile Broadband ("eMBB"), Evolved Node-B ("eNB"), Evolved Packet Core ("EPC"), Evolved UMTS Terrestrial Radio Access Network ("E-UTRAN"), Home Subscriber Server ("HSS"), International Mobile Subscriber Identity ("IMSI"), IP Multimedia Subsystem ("IMS," aka "IP Multimedia Core Network Subsystem"), Internet Protocol ("IP"), Long Term Evolution ("LTE"), LTE Advanced ("LTE-A"), Medium Access Control ("MAC"), Mobile Country Code ("MCC"), Mobile Network Code ("MNC"), Mobile Network Operator ("MNO"). Mobility Management Entity ("MME"), Non-Access Stratum ("NAS"), Narrowband ("NB"), Network Function ("NF"), Network Access Identifier ("NAI"), Next Generation (e.g., 5G) Node-B ("gNB"), Next Generation Application Protocol ("NGAP"), Next Generation Radio Access Network ("NG-RAN"), New Radio ("NR"), Non-5G-capable-over-WLAN ("N5CW"), Policy Control Function ("PCF"), Packet Data Network ("PDN"), Packet Data Unit ("PDU"), PDN Gateway ("PGW"), Public Land Mobile Network ("PLMN"), Quality of Service ("QoS"), Radio Access Network ("RAN"), Radio Access Technology ("RAT"), Radio Resource Control ("RRC"), Receive ("Rx"), Security Mode Control ("SMC"), Single Network Slice Selection Assistance Information ("S-NSSAI"), Serving Gateway ("SGW"), Session Management Function ("SMF"), Subscription Concealed Identifier ("SUCI"), Subscription Permanent Identifier ("SUPI"), Transmission Control Protocol ("TCP"), Transmit ("Tx"), Trusted Non-3GPP Access Network ("TNAN"), Trusted Non-3GPP Access Point ("TNAP"), Trusted Non-3GPP Gateway Function ("TNGF"), Unified Data Management ("UDM"), User Entity/Equipment (Mobile Terminal) ("UE"), Uplink ("UL"). User Plane ("UP"), Universal Mobile Telecommunications System ("UMTS"), User Datagram Protocol ("UDP"), User Location Information ("ULI"), Wireless Local Area Network ("WLAN"), and Worldwide Interoperability for Microwave Access ("WiMAX").

In certain embodiments, a UE may access a 5G core ("5GC") network via a gateway function in a trusted non-3GPP access network ("TNAN"). However, a special type of UEs is unable to support 5G NAS protocols over non-3GPP access.

BRIEF SUMMARY

One method of a first network function, e.g., an AMF, for selecting an authentication type in a 5G network includes receiving a registration request message from a remote unit (i.e., UE) and receiving a subscription retrieval information. Here, the registration request message contains an external subscriber identifier of the UE and the subscription retrieval information is different than the UE identifier. The method includes transmitting to a network function in a mobile communication network a first request for subscription data retrieval using the subscription retrieval information and receiving a response message from the network function that contains the UE subscription data. Here, the subscription retrieval information indicates that the subscription data is stored in a subscription owner outside the mobile communication network.

One method of a second network function, e.g., a TWIF, for selecting an authentication type in a 5G network includes receiving a registration request message from a remote unit (i.e., UE) and receiving a subscription retrieval information. Here, the registration request message contains an external subscriber identifier of the UE and the subscription retrieval information is different than the UE identifier. The method includes transmitting to a network function in a mobile communication network a first request for subscription data retrieval using the subscription retrieval information and receiving a response message from the network function that contains the UE subscription data. Here, the subscription retrieval information indicates that the subscription data is stored in a subscription owner outside the mobile communication network.

One method of a third network function, e.g., a UDM, for selecting an authentication type in a 5G network includes receiving from an AUSF in a mobile communication network a first request to provide authentication data for a remote unit, where the request indicates an authentication request type. The third method includes selecting a first authentication method using the authentication request type and subscription data of the remote unit and responding to the first request by sending an authentication vector, where the response also indicates the first authentication method.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
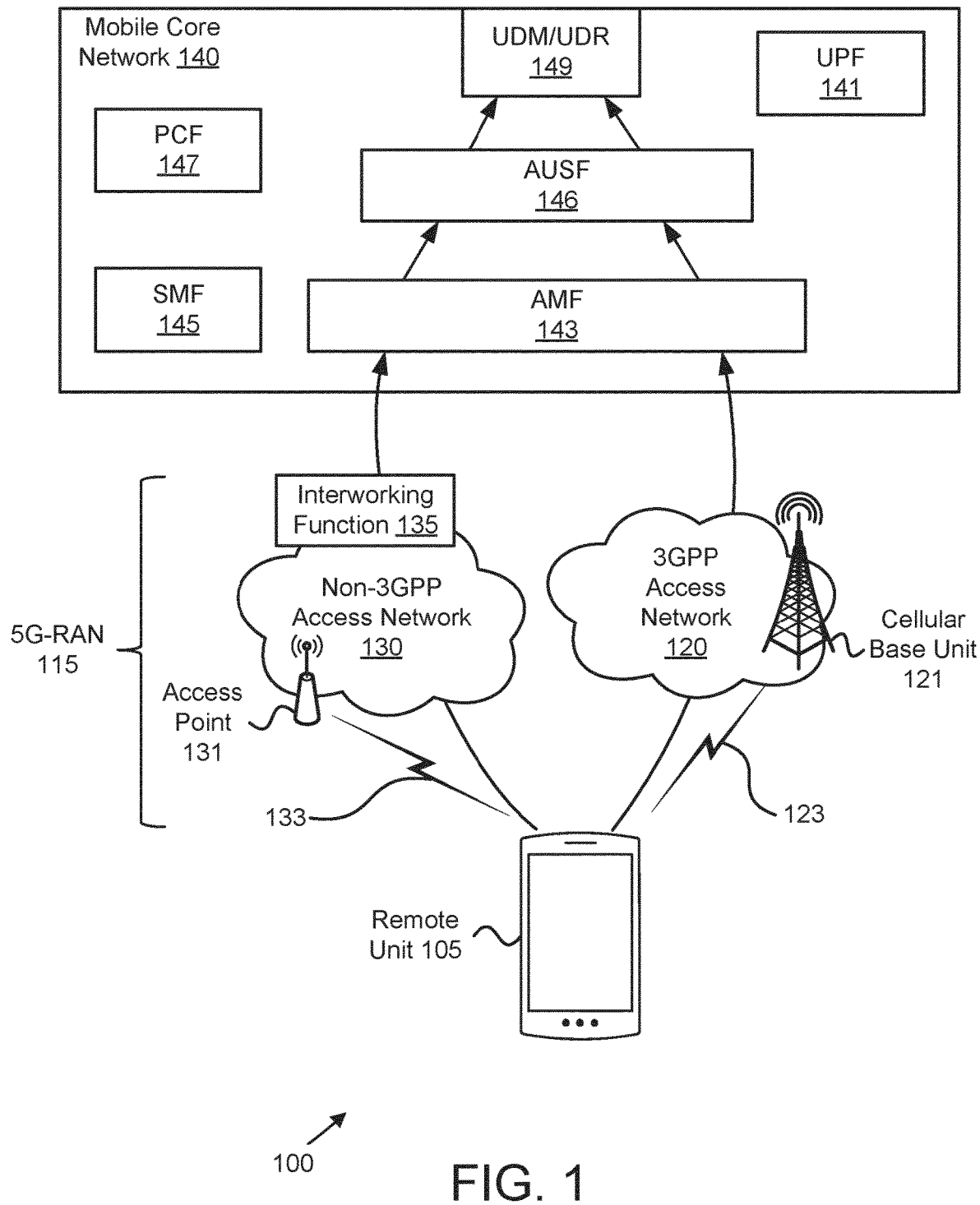
FIG. 1 is a diagram illustrating one embodiment of a wireless communication system for selecting an authentication type in a 5G network.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store, a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures Like numbers refer to like elements in all figures, including alternate embodiments of like elements.

Methods, apparatuses, and systems are disclosed for selecting an authentication type in a 5G network. A UE may access a 5G core ("5GC") network via a Trusted Non-3GPP Gateway Function ("TNGF") in a trusted non-3GPP access network ("TNAN"). Present 3GPP specification require that every UE that is able to access a 5G PLMN must support two authentication methods: EAP-AKA' and 5G-AKA.

When a UE attempts to access a 5G PLMN, during the primary authentication procedure the UDM in the home PLMN selects an authentication method (either EAP-AKA' or 5G-AKA) for this UE, based on the UE subscriber permanent identity (SUPI). However, choosing an authentication method based only on SUPI is not feasible for a special UE type, i.e., for a UE which (a) operates as a normal 5G UE when using 3GPP access, and (b) operates as a Non-5G-capable device when using WLAN access.

This special UE type can register with a 5G core (5GC) network either via a 3GPP access network (e.g., NG-RAN or E-UTRAN) or via a non-3GPP access network (e.g., a WLAN), but it applies different capabilities. Over a 3GPP access network, this type of UE applies the 5G NAS protocol and it requests a 5G registration by sending a NAS Registration Request message. Over a non-3GPP access network, this special type of UE does not support the 5G NAS protocol and it requests a 5G registration by initiating an EAP authentication procedure with a special NAI. Note that a NAI may have the format <username@realm>, where the special NAI may include an indicator in the username portion and/or the realm portion of the NAI. In this case, the NAS Registration Request is created by a Trusted WLAN Interworking Function ("TWIF") on behalf of the UE.

For the above special UE type, it is clear that, when it attempts a registration over non-3GPP access, the UDM shall not select the 5G-AKA authentication method because this authentication method is based on the 5G NAS protocol, but the UE does not support the 5G NAS protocol. Therefore, the 5G primary authentication procedure should be enhanced so that the UDM can select the EAP-AKA' authentication method in this case. Selecting an authentication method based only on the SUPI of the UE (as currently specified) may result in selecting an unsupported authentication method for the UE (i.e., 5G-AKA), which will result in registration failure over non-3GPP access.

This special type of UE is also referred to a Non-5G-capable-over-WLAN ("N5CW") device, in order to make it clear that it is non-5G capable (i.e., cannot use the 5G NAS protocol) when it communicates with 5GC via a WLAN access network. Note, however, that a N5CW device may be 5G capable when it communicates with 5GC via a 3GPP access network. Hence, the same device can have two "personalities": it can be a regular 5G UE when it communicates with 5GC via a 3GPP access network, and it can be a N5CW device when it communicates with 5GC via a non-3GPP access network. Each "personality" is associated with different authentication capabilities over 3GPP access and non-3GPP access, which is the source of the problem presented above.

FIG. 1 depicts a wireless communication system 100 for selecting an authentication type in a 5G network, according to embodiments of the disclosure. In one embodiment, the wireless communication system 100 includes at least one remote unit 105, at least one trusted non-3GPP access network ("TNAN") 120, and a mobile core network 140 in a PLMN. The TNAN 120 may be composed of at least one base unit 121. The remote unit 105 may communicate with the TNAN 120 using non-3GPP communication links 113, according to a radio access technology deployed by TNAN 120. Even though a specific number of remote units 105, base units 121. TNANs 120, and mobile core networks 140 are depicted in FIG. 1, one of skill in the art will recognize that any number of remote units 105, base units 121, TNANs 120, and mobile core networks 140 may be included in the wireless communication system 100.

In one implementation, the wireless communication system 100 is compliant with the 5G system specified in the 3GPP specifications. More generally, however, the wireless communication system 100 may implement some other open or proprietary communication network, for example, LTE/EPC (referred as '4G') or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the base units 121 in the TNAN 120 via uplink ("UL") and downlink ("DL") communication signals. Furthermore, the UL and DL communication signals may be carried over the communication links 113. Note, that the TNAN 120 is an intermediate network that provide the remote units 105 with access to the mobile core network 140.

The base units 121 may serve a number of remote units 105 within a serving area, for example, a cell or a cell sector, via a communication link 113. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the communication links 113. The communication links 113 may be any suitable carrier in licensed or unlicensed radio spectrum. The communication links 113 facilitate communication between one or more of the remote units 105 and/or one or more of the base units 121.

As noted above, the TNAN 120 supports secure signaling interfaces and interworking with the 5G core network. The TNAN includes at least one TNGF; in the depicted embodiment the TNAN 120 includes a first TNGF ("TNGF-1") 125 and a second TNGF ("TNGF-2") 127. In certain embodiments, the TNAN 120 supports a Tn interface between the TGNF in the TNAN 120.

The base units 121 may be distributed over a geographic region. In certain embodiments, a base unit 121 may also be referred to as a Trusted Non-3GPP Access Point ("TNAP"), an access terminal, an access point, a base, a base station, a relay node, a device, or by any other terminology used in the art. The base units 121 are generally part of a radio access network ("RAN"), such as the TNAN 120, that may include one or more controllers communicably coupled to one or more corresponding base units 121. These and other elements of radio access network are not illustrated but are well known generally by those having ordinary skill in the art. The base units 121 connect to the mobile core network 140 via the TNAN 120.

In some embodiments, the remote units 105 communicate with an application server (or other communication peer) via a network connection with the mobile core network 140. For example, an application in a remote unit 105 (e.g., web browser, media client, telephone/VoIP application) may trigger the remote unit 105 to establish a PDU session (or other data connection) with the mobile core network 140 using the TNAN 120. In order to establish the PDU session, the remote unit 105 must be registered with the mobile core network.

In one embodiment, the mobile core network 140 is a 5G core ("5GC") or the evolved packet core ("EPC"), which may be coupled to a data network (such as the Internet and private data networks, among other data networks). A remote unit 105 may have a subscription or other account with the mobile core network 140. The present disclosure is not intended to be limited to the implementation of any particular wireless communication system architecture or protocol.

The mobile core network 140 includes several network functions ("NFs"). As depicted, the mobile core network 140 includes at least one user plane function ("UPF") 141. The mobile core network 140 also includes multiple control plane functions including, but not limited to, an Access and Mobility Management Function ("AMF") 143, a Session Management Function ("SMF") 145, an Authentication Server Function ("AUSF") 146, a Policy Control Function ("PCF") 147, and a Unified Data Management function ("UDM") 149. In certain embodiments, the mobile core network 140 may also include a Network Repository Function ("NRF") (used by the various NFs to discover and communicate with each other over APIs), or other NFs defined for the 5G Core.

The remote unit 105 may request registration to the mobile core network 140 (e.g., 5GC) either over 3GPP access 120 (e.g., NG-RAN or E-UTRAN), or over non-3GPP access 130 (e.g., WLAN). The interworking function 135 creates the NAS Registration Request on behalf of a remote unit 105 that does not support the 5G-NAS protocol over non-3GPP access networks 130, e.g., as specified in TS 23.502, clause 4.12b. In various implementations, the interworking function 135 is an embodiment of a Trusted WLAN Interworking Function ("TWIF").

The UDM 149 is the Unified Data Management function, which selects an authentication method every time a remote unit 105 must be authenticated (e.g., during a registration procedure) and creates the applicable authentication data. The AUSF 146 is the Authentication Server Function, which receives the selected authentication method and the authentication data from the UDM 149 and authenticates the remote unit 105.

In various embodiments, the mobile core network 140 supports different types of mobile data connections and different types of network slices, wherein each mobile data connection utilizes a specific network slice. Each network slice includes a set of CP and UP network functions, wherein each network slice is optimized for a specific type of service or traffic class. The different network slices are not shown in FIG. 1 for case of illustration, but their support is assumed. In one example, each network slice instance includes an instance of the SMF 145 and the UPF 141, but the various network slices share the AMF 143, the PCF 147, and the UDM/UDR 149. In another example, each network slice instance includes an instance of the AMF 143, the SMF 145, and the UPF 141. Although specific numbers and types of network functions are depicted in FIG. 1, one of skill in the art will recognize that any number and type of network functions may be included in the mobile core network 140.

As discussed above, for a remote unit 105 that does not support the 5G-NAS protocol over non-3GPP access networks 130, selecting an authentication method based only on the SUPI of the UE (as currently specified) may result in selecting an unsupported authentication method for the (i.e., 5G-AKA), which will result in registration failure over non-3GPP access. Thus, the behavior of the interworking function 135 and/or mobile core network 140 is modified to not select an unsupported authentication method, as described in greater detail below.

FIGS. 2A-2D illustrate a signaling flow that is applied when a UE that does not support 5G NAS over non-3GPP access 130 requests to register to 5GC (in 5G PLMN 215) via a WLAN access network (e.g., a trusted non-3GPP access network 210). This type of UE is also referred to a Non-5G-capable-over-WLAN ("N5CW") device 205, in order to make it clear that it is non-5G capable (i.e., cannot use the 5G NAS protocol) when it communicates with 5GC via a WLAN access network. Note, however, that a N5CW device 205 may be 5G capable when it communicates with 5GC via a 3GPP access network 120. Hence, the same device can have two "personalities": it can be a regular 5G UE when it communicates with 5GC via a 3GPP access network 120, and it can be a N5CW device when it communicates with 5GC via a non-3GPP access network 130. Each "personality" is associated with different authentication capabilities over 3GPP access and non-3GPP access, which is the source of the problem described above.

The procedure 200 involves a N5CW device 205 (i.e., one embodiment of the remote unit 105), the TNAN 210 (i.e., one embodiment of the non-3GPP access network 130), the TWIF 215 (i.e., one embodiment of the interworking function 135), and 5GC NFs in the 5G PLMN 215, specifically an AMF 217 (i.e., one embodiment of the AMF 143), an AUSF 218 (i.e., one embodiment of the AUSF 146), and a UDM 219 (i.e., one embodiment of the UDM/UDR 149).

The procedure 200 modifies the procedure specified in TS 23.502 v16.4.0, clause 4.12b.2, with some novel enhancements that aim at assisting the UDM 209 to select the right authentication method (i.e., EAP-AKA') when a N5CW device 205 attempts to register with a 5GC (in the 5G PLMN 215) via non-3GPP access (i.e., TNAN 210). It is noted again that, without these enhancements, the UDM 219 would select an authentication method based only on the SUPI of the N5CW device 205 and thus may select 5G-AKA, which is not supported by the N5CW device 205. In the most typical case, the trusted non-3GPP access network 210 is a WLAN access network complying with the IEEE 802.11 specification.

Figure 2A:
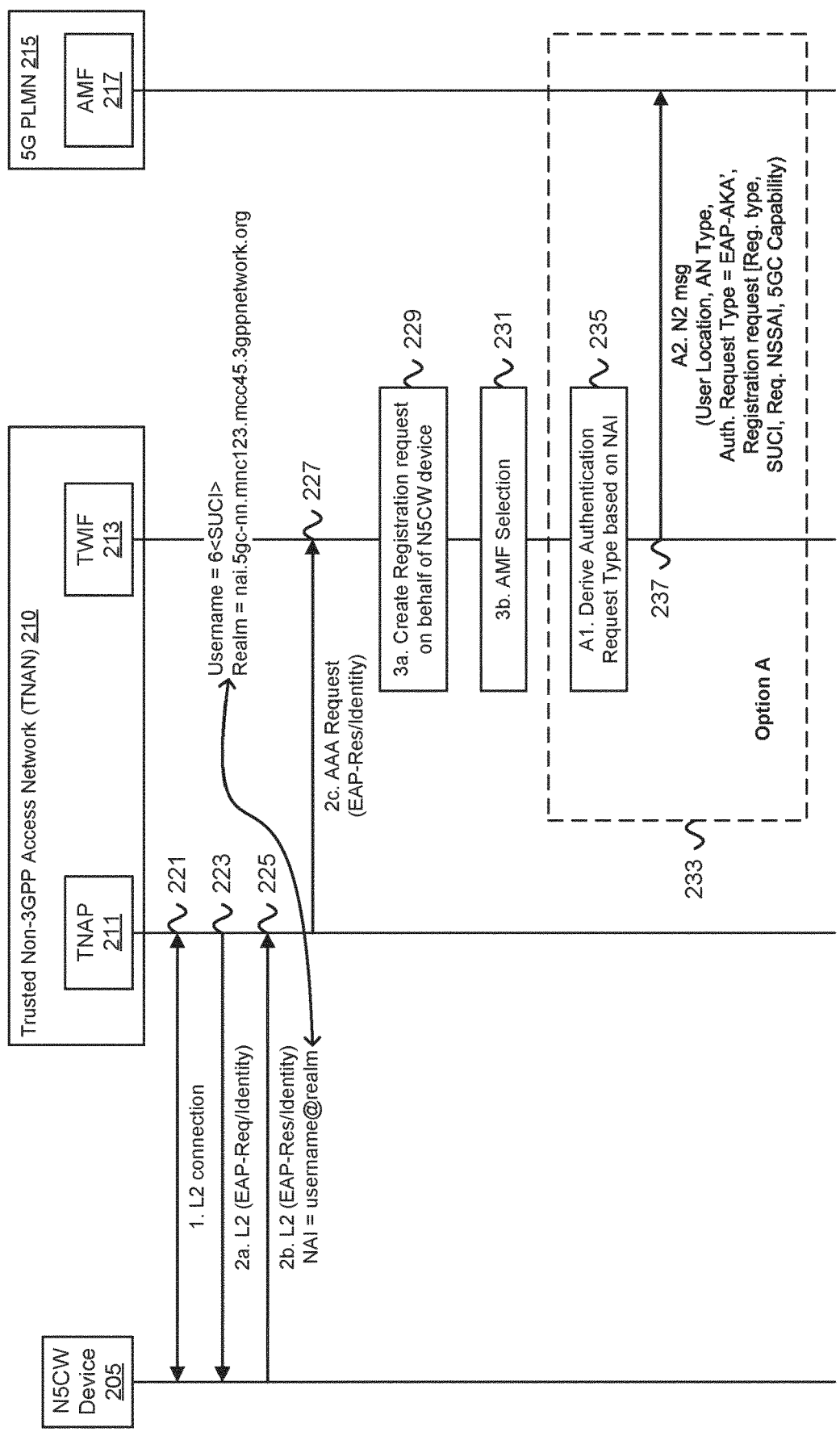
FIG. 2A is a signal flow diagram illustrating one embodiment of a procedure that enables a UE which does not support 5G NAS over non-3GPP access to register to a 5G network over a trusted non-3GPP access network using a selected authentication type.

The procedure 200 begins at FIG. 2A, in step 1, the N5CW device 205 discovers a WLAN access network (i.e., TNAN 210), which advertises that it supports 5G connectivity to one or more PLMNs for devices that do not support the 5G NAS protocols. This WLAN access network is called "trusted" WLAN access network because it supports N2/N3 connectivity with each of these PLMNs.

The N5CW device 205 decides to connect to one of these PLMNs (i.e., to the 5G PLMN 215) via the discovered TNAN 210 and establishes a Layer-2 (L2) connection with a Trusted Non-3GPP Access Point ("TNAP") 211 in the discovered TNAN 210 (see messaging 221). In the case of an IEEE 802.11 WLAN, this L2 connection corresponds to an IEEE 802.11 Association.

At step 2, an EAP procedure is initiated. EAP packets are encapsulated into L2 packets, e.g., into IEEE 802.11/802.1x packets, between the N5CW device 205 and the TNAN 210. The TNAP 211 requests an identity of the N5CW device 205 (see messaging 223) and the N5CW device 205 responds with an L2 packet containing a NAI. The NAI provided by the N5CW device 205 indicates that it requests "5G connectivity without NAS" to a specific PLMN, i.e., NAI="6<SUCI>@nai.5gc-nn.mnc<MNC>.mcc<MCC>.3gppnetwork.org". Note that the prefix "6" is a special digit indicating a capability of the N5CW device, as described in further detail below. The MNC, MCC is the identity of the specific 5G PLMN 215 and the "5gc-nn" label indicates 5G connectivity with no NAS. The SUCI is a Subscription Concealed Identifier, which identifies a subscription in the 5G PLMN 210 and enables identity privacy, i.e., does not disclose the real subscription identity to intermediary functions. In various embodiments, the SUCI is based on a permanent subscription identity of the N5CW device 205, such as a SUPI and/or IMSI.

The NAI provided by the N5CW device 205 triggers the TNAP 211 to select a TWIF 213 that provides 5G connectivity to the indicated 5G PLMN 215 and to send a AAA request to the selected TWIF 213 (see messaging 227). Between the TNAP 211 and the selected TWIF 213, each EAP packet is encapsulated into a AAA message.

At step 3, after receiving the AAA request in step 2c, the TWIF 213 creates a NAS Registration Request message on behalf of the N5CW device 205 (see block 229) and selects an AMF 217 in the indicated PLMN to forward the NAS Registration Request to, over the N2 interface (see block 231). In some embodiments, the TWIF 213 derives an Authentication Request Type for the NAS Registration Request, as illustrated in Option A (block 233). In other embodiments, the AMF 217 derives the Authentication Request Type, as illustrated in Option B (block 239).

At step A1 (part of Option A), the TWIF 213 derives the Authentication Request Type based on the received NAI (see block 235). The Authentication Request Type indicates the requested authentication method for this N5CW device 205, e.g., it is set to EAP-AKA' because it is known that a N5CW device 205 cannot support 5G-AKA. In certain embodiments, the TWIF 213 may always set the Authentication Request Type to EAP-AKA'. Alternatively, the TWIF 213 may utilize the digit preceding <SUCI> in the NAI to determine the authentication method preferred by the N5CW device 205. This digit is set to "6" for EAP-AKA', to "0" for EAP-AKA, to "1" for EAP-SIM, etc. However, in other network implementations, different prefixes may be used to indicate the different candidate authentication methods.

At step A2 (also part of Option A), the TWIF 213 forwards the created NAS Registration Request message to the selected AMF 217 (see messaging 237). Here, the created NAS Registration Request message is sent within a N2 message which also contains the Authentication Request Type parameter (i.e., Auth. Request Type=EAP-AKA').

Figure 2B:
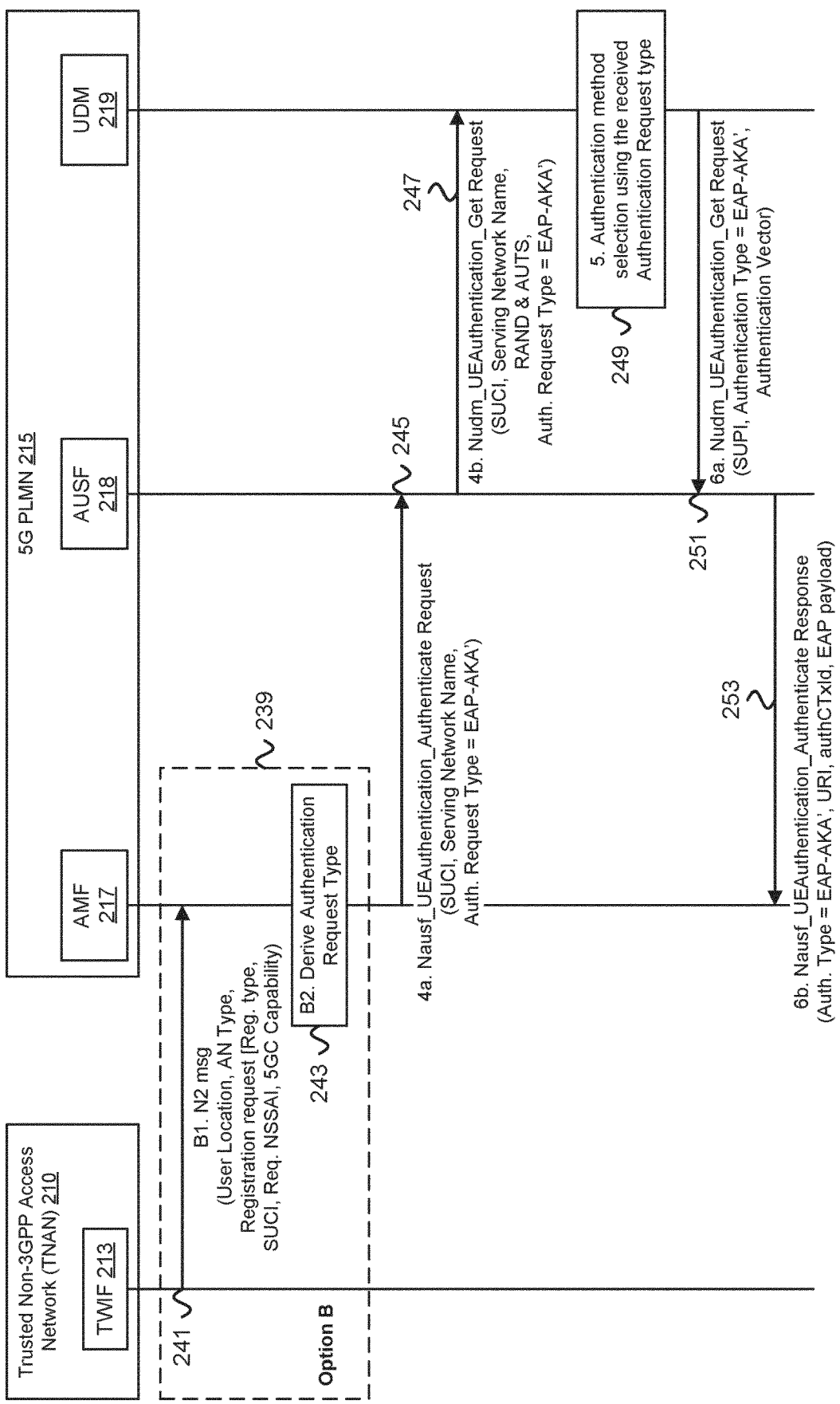
FIG. 2B is a continuation of the procedure depicted in FIG. 2A.

Continuing on FIG. 2B, at step B1 (part of Option B), alternatively, instead of steps A1-A2, the TWIF 213 does not derive an Authentication Request Type, but forwards the created NAS Registration Request message to the selected AMF 217, within a N2 message which does not contain an Authentication Request Type (see messaging 241).

At step B2 (also part of Option B), in this alternative, the AMF 217 generates the Authentication Request Type and, e.g., sets it always to EAP-AKA' (see block 243). Note that because the AMF 217 does not know the NAI provided by the N5CW device 205, it cannot utilize the digit preceding <SUCI> to determine the authentication method preferred by the N5CW device 205. However, this is not an issue when the PLMN supports only 5G-AKA and EAP-AKA' authentication methods.

It is important to note that the AMF 217 generates the Authentication Request Type only when it receives a NAS Registration Request message from a TWIF 213. When the AMF 217 receives a NAS Registration Request message from another radio access function (e.g., gNB. N3IWF, TNGF, W-AGF), the AMF 217 does not derive an Authentication Request Type.

At step 4a, the AMF 217 decides to authenticate the device requesting registration and sends a Nausf_UEAuthentication_Authenticate Request message to an AUSF 218 (see messaging 245). However, this message also contains the Authentication Request Type received from the TWIF 213 in step A2 or derived by AMF 217 in step B2.

At step 4b, before the AUSF 218 initiates the authentication procedure with the N5CW device 205, it requests from the UDM 219 to select an authentication method and to provide authentication data (also called authentication vectors) (see messaging 247). As depicted, in the Nudm_UEAuthentication_Get Request message the AUSF 218 also includes the Authentication Request Type received by AMF 217 according to Option A or derived by the AMF 217 according to Option B.

At step 5, the UDM 219 selects an authentication method using the received Authentication Request Type (see block 249). The UDM 219 may use the subscription data corresponding to the received subscriber identity (i.e., SUCI) to determine if the authentication method in the received Authentication Request Type is permitted by the subscription data or not. In the depicted embodiment, it is assumed that the requested EAP-AKA' method is permitted for the N5CW device 205.

At step 6, if the authentication method in the received Authentication Request Type is permitted by the subscription data, then the UDM 219 selects this authentication method and provides to AUSF 218 (a) the selected authentication method (in the Authentication Type element) and (b) the requested authentication vector for this authentication method (see messaging 251). In turn, the AUSF 218 initiates an EAP authentication procedure according with the selected authentication method, e.g., it creates an EAP/AKA-Challenge packet, if EAP-AKA' is selected. The AUSF 218 sends a response to the AMF 217 including the created EAP packet in the EAP payload (see messaging 253).

Figure 2C:
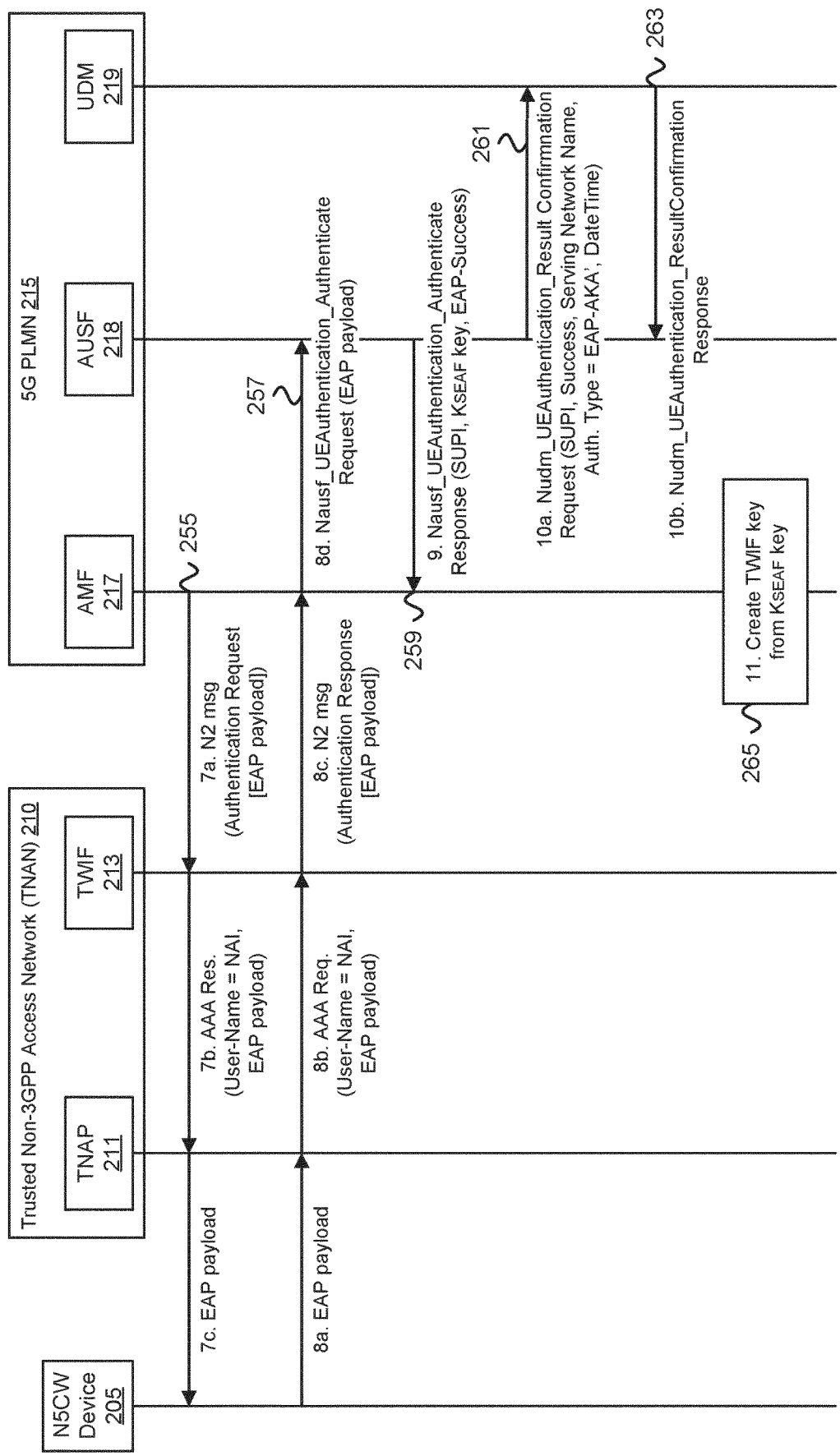
FIG. 2C is a continuation of the procedure depicted in FIG. 2B.
Figure 2D:
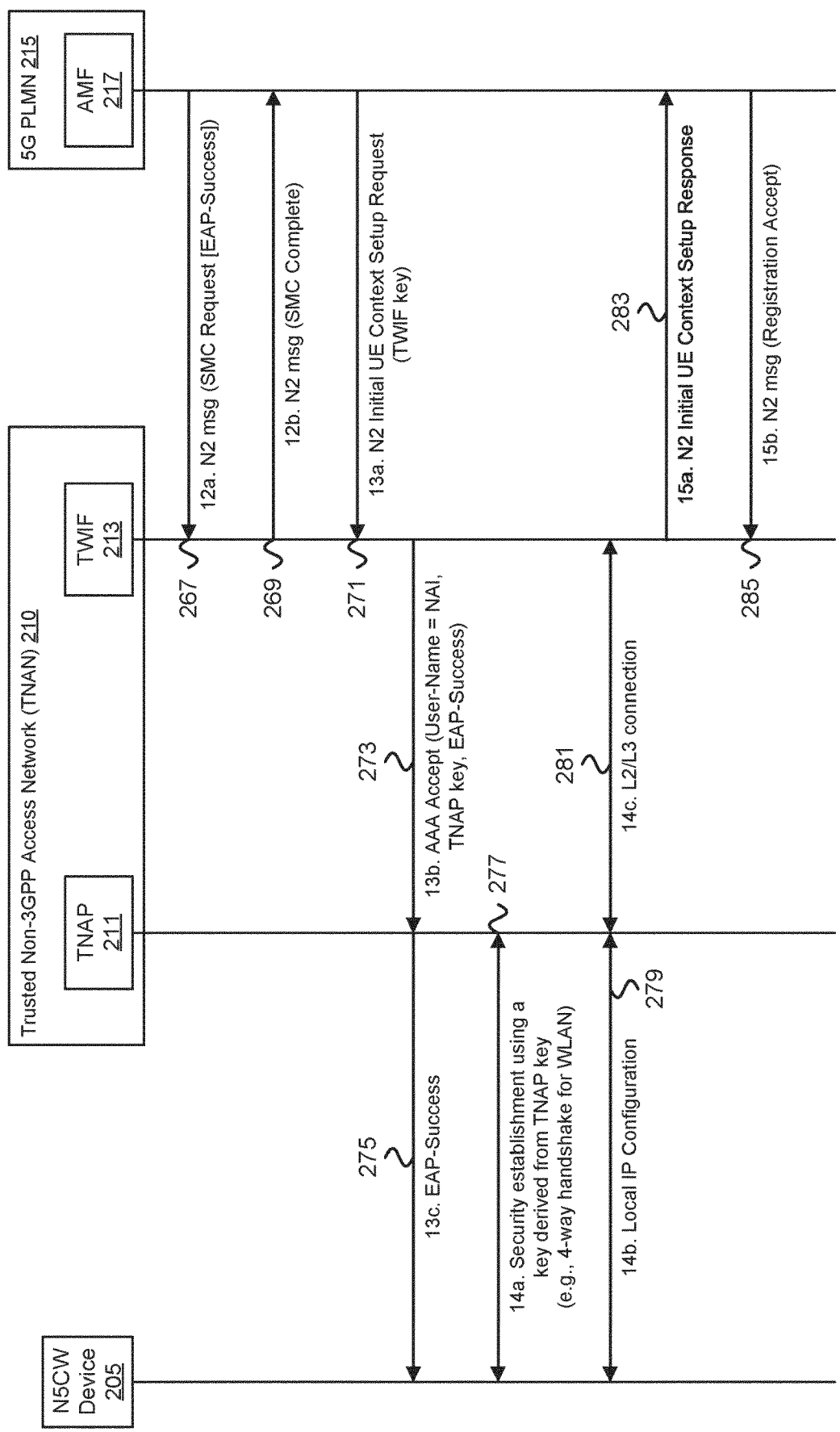
FIG. 2D is a continuation of the procedure depicted in FIG. 2C.

Continuing on FIG. 2C, at step 7, the EAP packet created by AUSF 218 is forwarded to the N5CW device 205 via the AMF 217, the TWIF 213 and the TNAP 211 (see messaging 255).

At step 8, the N5CW device 205s sends a response EAP packet, which is forwarded to AUSF 218 via the TNAP 211, the TWIF 213 and the AMF 217 (see messaging 257). More EAP packets may be exchanged between the UE and the AUSF 218, as in steps 7 and 8.

At step 9, after the authentication is successfully completed, the AUSF 218 sends a message to the AMF 217 including an EAP-Success packet (again as an EAP payload), a KSEAF key and the unconcealed subscriber identity (i.e., SUPI) of the N5CW device 205 (see messaging 259).

At step 10a, in addition, the AUSF 218 indicates to the UDM 219 that the authentication was successfully completed by sending a Nudm_UEAuthentication_ResultConfirmation Request message (see messaging 261). At step 10b, the UDM 219 responds with a Nudm_UEAuthentication_ResultConfirmation Response message (see messaging 263).

At step 11, the AMF 217 creates a TWIF key from the received KSEAF key (see block 265).

At step 12a, the AMF 217 initiates the normal Security Mode Control (SMC) procedure (see messaging 267). At step 12b, the TWIF 213 responds on behalf of the N5CW device 205 (see messaging 269). This SMC procedure is executed between the TWIF 213 and the AMF 217, because the N5CW device 205 does not support 5G NAS.

At step 13, the AMF 217 sends an N2 Initial UE Context Setup Request message to the TWIF 213, in order to create a secure communication channel with the N5CW device 205 (see messaging 271). This message contains the TWIF key and triggers the TWIF 213 to send the EAP-Success message to N5CW device 205 and a TNAP key to the TNAP 211 (see messaging 273, 275). The TNAP 211 uses the TNAP key to secure the air-interface communication between the N5CW device 205 and the TNAP 211. Note that the N5CW 205 derives a copy of the TNAP kay to use in securing the air-interface.

At step 14a, security is established between the N5CW device 205 and the TNAP 211 (see messaging 277) and the N5CW device 205 is successfully connected to the WLAN. At step 14b, the N5CW device 205 receives IP configuration data including an IP address (e.g., with DHCP procedures) (see messaging 279). A layer-2 (L2) or layer-3 (L3) connection is established between the TNAP 211 and the TWIF 213, which is further used to tunnel all traffic of N5CW device 205 to/from the TWIF 213 (see messaging 281).

At Steps 15a-15b, the TWIF 213 responds to the AMF 217 with an N2 Initial UE Context Response message (see messaging 283), which triggers the AMF 217 to complete the registration procedure by sending a NAS Registration Accept to the TWIF 213 (see messaging 285). After this step, the TWIF 213 may request a PDU Session on behalf of the N5CW device 205, e.g., as described in TS 23.502 v16.4.0, clause 4.12b.2, in order to route all data of the N5CW device 205 via the 5GC in the 5G PLMN 215.

Figure 3:
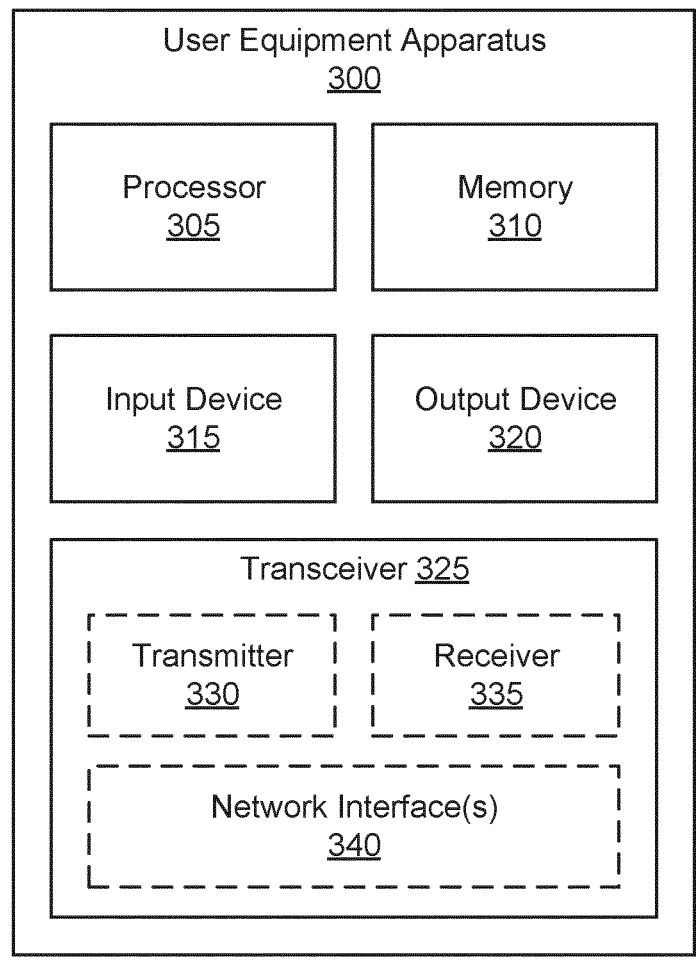
FIG. 3 is a block diagram illustrating one embodiment of a user equipment apparatus that supports selecting an authentication type in a 5G network.

FIG. 3 depicts one embodiment of a user equipment apparatus 300, according to embodiments of the disclosure. The user equipment apparatus 300 may be one embodiment of the remote unit 105 and/or the UE 205. Furthermore, the user equipment apparatus 300 may include a processor 305, a memory 310, an input device 315, an output device 320, a transceiver 325. In some embodiments, the input device 315 and the output device 320 are combined into a single device, such as a touch screen. In certain embodiments, the user equipment apparatus 300 does not include any input device 315 and/or output device 320.

As depicted, the transceiver 325 includes at least one transmitter 330 and at least one receiver 335. Here, the transceiver 325 communicates with a mobile core network (e.g., a 3GC) via an access network. Additionally, the transceiver 325 may support at least one network interface 340. Here, the at least one network interface 340 facilitates communication with an TNGF (e.g., using the "NWt" interface). Additionally, the at least one network interface 340 may include an interface used for communications with an AMF, an SMF, and/or a UPF.

The processor 305, in one embodiment, may include any known controller capable of executing computer-readable instructions and/or capable of performing logical operations. For example, the processor 305 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 305 executes instructions stored in the memory 310 to perform the methods and routines described herein. The processor 305 is communicatively coupled to the memory 310, the input device 315, the output device 320, and the transceiver 325.

In various embodiments, the processor 305 controls the user equipment apparatus 300 to implement the above described UE behaviors.

The memory 310, in one embodiment, is a computer readable storage medium. In some embodiments, the memory 310 includes volatile computer storage media. For example, the memory 310 may include a RAM, including dynamic RAM ("DRAM"), synchronous dynamic RAM ("SDRAM"), and/or static RAM ("SRAM"). In some embodiments, the memory 310 includes non-volatile computer storage media. For example, the memory 310 may include a hard disk drive, a flash memory, or any other suitable non-volatile computer storage device. In some embodiments, the memory 310 includes both volatile and non-volatile computer storage media.

In some embodiments, the memory 310 stores data relating to selecting an authentication type in a 5G network, for example storing authentication parameters, security keys, device/entity identifiers, IP addresses, and the like. In certain embodiments, the memory 310 also stores program code and related data, such as an operating system ("OS") or other controller algorithms operating on the user equipment apparatus 300 and one or more software applications.

The input device 315, in one embodiment, may include any known computer input device including a touch panel, a button, a keyboard, a stylus, a microphone, or the like. In some embodiments, the input device 315 may be integrated with the output device 320, for example, as a touchscreen or similar touch-sensitive display. In some embodiments, the input device 315 includes a touchscreen such that text may be input using a virtual keyboard displayed on the touchscreen and/or by handwriting on the touchscreen. In some embodiments, the input device 315 includes two or more different devices, such as a keyboard and a touch panel.

The output device 320, in one embodiment, may include any known electronically controllable display or display device. The output device 320 may be designed to output visual, audible, and/or haptic signals. In some embodiments, the output device 320 includes an electronic display capable of outputting visual data to a user. For example, the output device 320 may include, but is not limited to, an LCD display, an LED display, an OLED display, a projector, or similar display device capable of outputting images, text, or the like to a user. As another, non-limiting, example, the output device 320 may include a wearable display such as a smart watch, smart glasses, a heads-up display, or the like. Further, the output device 320 may be a component of a smart phone, a personal digital assistant, a television, a table computer, a notebook (laptop) computer, a personal computer, a vehicle dashboard, or the like.

In certain embodiments, the output device 320 includes one or more speakers for producing sound. For example, the output device 320 may produce an audible alert or notification (e.g., a beep or chime). In some embodiments, the output device 320 includes one or more haptic devices for producing vibrations, motion, or other haptic feedback. In some embodiments, all or portions of the output device 320 may be integrated with the input device 315. For example, the input device 315 and output device 320 may form a touchscreen or similar touch-sensitive display. In other embodiments, all or portions of the output device 320 may be located near the input device 315.

As discussed above, the transceiver 325 communicates with one or more network functions of a mobile communication network via one or more access networks. The transceiver 325 operates under the control of the processor 305 to transmit messages, data, and other signals and also to receive messages, data, and other signals. For example, the processor 305 may selectively activate the transceiver (or portions thereof) at particular times in order to send and receive messages.

The transceiver 325 may include one or more transmitters 330 and one or more receivers 335. Although only one transmitter 330 and one receiver 335 are illustrated, the user equipment apparatus 300 may have any suitable number of transmitters 330 and receivers 335. Further, the transmitter(s) 330 and the receiver(s) 335 may be any suitable type of transmitters and receivers. In one embodiment, the transceiver 325 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 325, transmitters 330, and receivers 335 may be implemented as physically separate components that access a shared hardware resource and/or software resource, such as for example, the network interface 340.

In various embodiments, one or more transmitters 330 and/or one or more receivers 335 may be implemented and/or integrated into a single hardware component, such as a multi-transceiver chip, a system-on-a-chip, an ASIC, or other type of hardware component. In certain embodiments, one or more transmitters 330 and/or one or more receivers 335 may be implemented and/or integrated into a multi-chip module. In some embodiments, other components such as the network interface 340 or other hardware components/circuits may be integrated with any number of transmitters 330 and/or receivers 335 into a single chip. In such embodiment, the transmitters 330 and receivers 335 may be logically configured as a transceiver 325 that uses one more common control signals or as modular transmitters 330 and receivers 335 implemented in the same hardware chip or in a multi-chip module.

Figure 4:
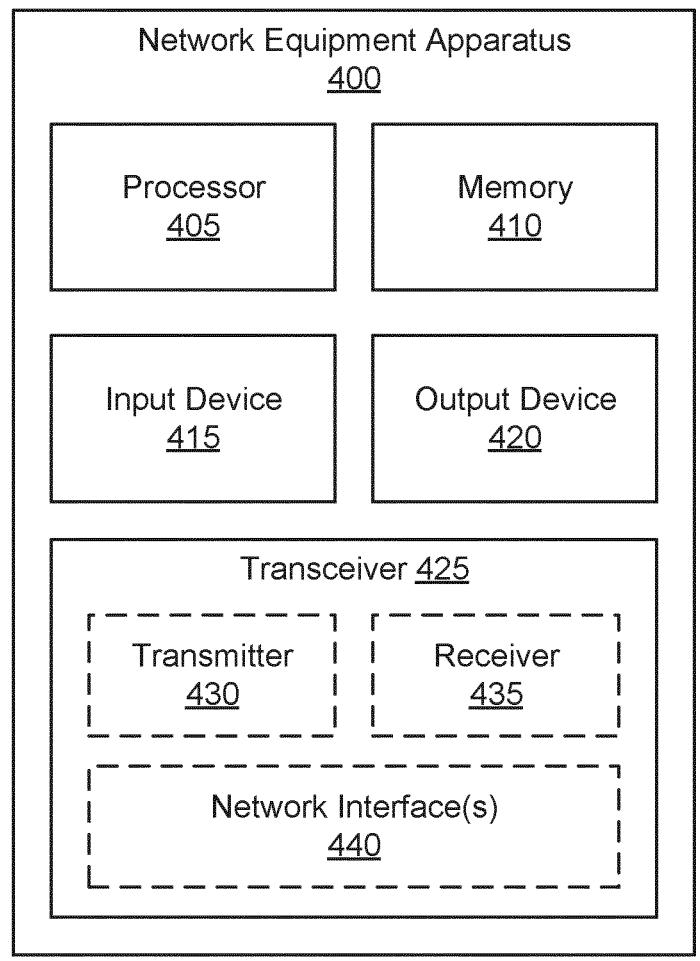
FIG. 4 is a block diagram illustrating one embodiment of a network equipment apparatus that supports selecting an authentication type in a 5G network.

FIG. 4 depicts one embodiment of a network equipment apparatus 400, according to embodiments of the disclosure. In some embodiments, the network equipment apparatus 400 may be one embodiment of a TNGF (i.e., TNGF1 and/or TNGF2). In other embodiments, the network equipment apparatus 400 may be one embodiment of an AMF. Furthermore, network equipment apparatus 400 may include a processor 405, a memory 410, an input device 415, an output device 420, a transceiver 425. In some embodiments, the input device 415 and the output device 420 are combined into a single device, such as a touch screen. In certain embodiments, the network equipment apparatus 400 does not include any input device 415 and/or output device 420.

As depicted, the transceiver 425 includes at least one transmitter 430 and at least one receiver 435. Here, the transceiver 425 communicates with one or more remote units 65. Additionally, the transceiver 425 may support at least one network interface 440, such as the NWt, N2, and N3 interfaces depicted in FIG. 1. In some embodiments, the transceiver 425 supports a first interface for communicating with a RAN node, a second interface for communicating with one or more network functions in a mobile core network (e.g., a 4GC) and a third interface for communicating with a remote unit (e.g., UE).

The processor 405, in one embodiment, may include any known controller capable of executing computer-readable instructions and/or capable of performing logical operations. For example, the processor 405 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 405 executes instructions stored in the memory 410 to perform the methods and routines described herein. The processor 405 is communicatively coupled to the memory 410, the input device 415, the output device 420, and the first transceiver 425.

In various embodiments, the processor 405 controls the network equipment apparatus 400 to implement the above described AMF behaviors. In some embodiments, via the network interface 440 the processor 405 receives a network interface 440 that receives a first message from an interworking function in a non-3GPP access network (i.e., TWIF), where the first message requests 5G registration to the mobile communication network on behalf of a remote unit that does not support the NAS protocol (i.e., a N5CW device).

The processor 405 determines a requested authentication method for the remote unit, where the requested authentication method is not based on the NAS protocol and forwards the requested authentication method to a data management function (i.e., UDM) via an AUSF in the mobile communication network. Here, the requested authentication method is applied by the data management function to select an authentication method for the remote unit, where the selected authentication method is not based on the NAS protocol. The processor 405 initiates a security mode control procedure with the interworking function in response to the remote unit successfully completing authentication using the selected authentication method.

In some embodiments, the first message is a NGAP message containing a NAS registration request message and an authentication type parameter, where determining the requested authentication method comprises parsing the first message for an authentication type parameter. In some embodiments, determining the requested authentication method comprises selecting a pre-configured authentication method type (i.e., EAP-AKA') whenever the first message is received. In some embodiments, Request message containing the requested authentication method, where the Authentication Request message indicates that the remote unit should be authenticated using an authentication method based on the requested authentication method.

In various embodiments, the processor 405 controls the network equipment apparatus 400 to implement the above described TWIF behaviors. In some embodiments, via the network interface 440 the processor 405 receives a first message requesting to register a remote unit to the mobile communication network, where the remote unit is connected to a non-3GPP access network and where the remote unit does not support the NAS protocol (i.e., the remote unit is a N5CW device). The processor 405 determines an authentication request type for the remote unit, where the authentication request type is not based on the NAS protocol. The processor 405 creates a NAS registration message on behalf of the remote unit and sends a second message to an access management function in the mobile communication network, where the second message contains the NAS registration message and the determined authentication request type.

In some embodiments, the first message comprises a NAI which indicates that the remote unit does not support the NAS protocol, where determining the authentication request type comprises selecting an authentication request type based on the NAI. In certain embodiments, a portion of the NAI indicates an authentication method preferred by the remote unit, where determining the authentication request type is based on the authentication method preferred by the remote unit. In some embodiments, the apparatus is configured with a default authentication method type to use whenever the first message is received.

In various embodiments, the processor 405 controls the network equipment apparatus 400 to implement the above described UDM behaviors. In some embodiments, via the network interface 440 the processor 405 receives from an AUSF in the mobile communication network a first request to provide authentication data for a remote unit (i.e., a N5CW device), where the request indicates an authentication request type. The processor 405 selects a first authentication method using the authentication request type and subscription data of the remote unit and responds to the first request by sending an authentication vector, where the response also indicates the first authentication method.

In some embodiments, selecting the first authentication method comprises determining whether the authentication request type is permitted by the subscription data. In some embodiments, the first request includes a SUCI of the remote unit, where the processor 405 decodes the SUCI to retrieve the subscription data of the remote unit.

The memory 410, in one embodiment, is a computer readable storage medium. In some embodiments, the memory 410 includes volatile computer storage media. For example, the memory 410 may include a RAM, including dynamic RAM ("DRAM"), synchronous dynamic RAM ("SDRAM"), and/or static RAM ("SRAM"). In some embodiments, the memory 410 includes non-volatile computer storage media. For example, the memory 410 may include a hard disk drive, a flash memory, or any other suitable non-volatile computer storage device. In some embodiments, the memory 410 includes both volatile and non-volatile computer storage media.

In some embodiments, the memory 410 stores data relating to selecting an authentication type in a 5G network, for example storing security keys, IP addresses, UE contexts, and the like. In certain embodiments, the memory 410 also stores program code and related data, such as an operating system ("OS") or other controller algorithms operating on the network equipment apparatus 400 and one or more software applications.

The input device 415, in one embodiment, may include any known computer input device including a touch panel, a button, a keyboard, a stylus, a microphone, or the like. In some embodiments, the input device 415 may be integrated with the output device 420, for example, as a touchscreen or similar touch-sensitive display. In some embodiments, the input device 415 includes a touchscreen such that text may be input using a virtual keyboard displayed on the touchscreen and/or by handwriting on the touchscreen. In some embodiments, the input device 415 includes two or more different devices, such as a keyboard and a touch panel.

The output device 420, in one embodiment, may include any known electronically controllable display or display device. The output device 420 may be designed to output visual, audible, and/or haptic signals. In some embodiments, the output device 420 includes an electronic display capable of outputting visual data to a user. For example, the output device 420 may include, but is not limited to, an LCD display, an LED display, an OLED display, a projector, or similar display device capable of outputting images, text, or the like to a user. As another, non-limiting, example, the output device 420 may include a wearable display such as a smart watch, smart glasses, a heads-up display, or the like. Further, the output device 420 may be a component of a smart phone, a personal digital assistant, a television, a table computer, a notebook (laptop) computer, a personal computer, a vehicle dashboard, or the like.

In certain embodiments, the output device 420 includes one or more speakers for producing sound. For example, the output device 420 may produce an audible alert or notification (e.g., a beep or chime). In some embodiments, the output device 420 includes one or more haptic devices for producing vibrations, motion, or other haptic feedback. In some embodiments, all or portions of the output device 420 may be integrated with the input device 415. For example, the input device 415 and output device 420 may form a touchscreen or similar touch-sensitive display. In other embodiments, all or portions of the output device 420 may be located near the input device 415.

As discussed above, the transceiver 425 may communicate with one or more remote units and/or with one or more interworking functions that provide access to one or more PLMNs. The transceiver 425 may also communicate with one or more network functions (e.g., in the mobile core network 140). The transceiver 425 operates under the control of the processor 405 to transmit messages, data, and other signals and also to receive messages, data, and other signals. For example, the processor 405 may selectively activate the transceiver (or portions thereof) at particular times in order to send and receive messages.

The transceiver 425 may include one or more transmitters 430 and one or more receivers 435. In certain embodiments, the one or more transmitters 430 and/or the one or more receivers 435 may share transceiver hardware and/or circuitry. For example, the one or more transmitters 430 and/or the one or more receivers 435 may share antenna(s), antenna tuner(s), amplifier(s), filter(s), oscillator(s), mixer(s), modulator/demodulator(s), power supply, and the like. In one embodiment, the transceiver 425 implements multiple logical transceivers using different communication protocols or protocol stacks, while using common physical hardware.

Figure 5:
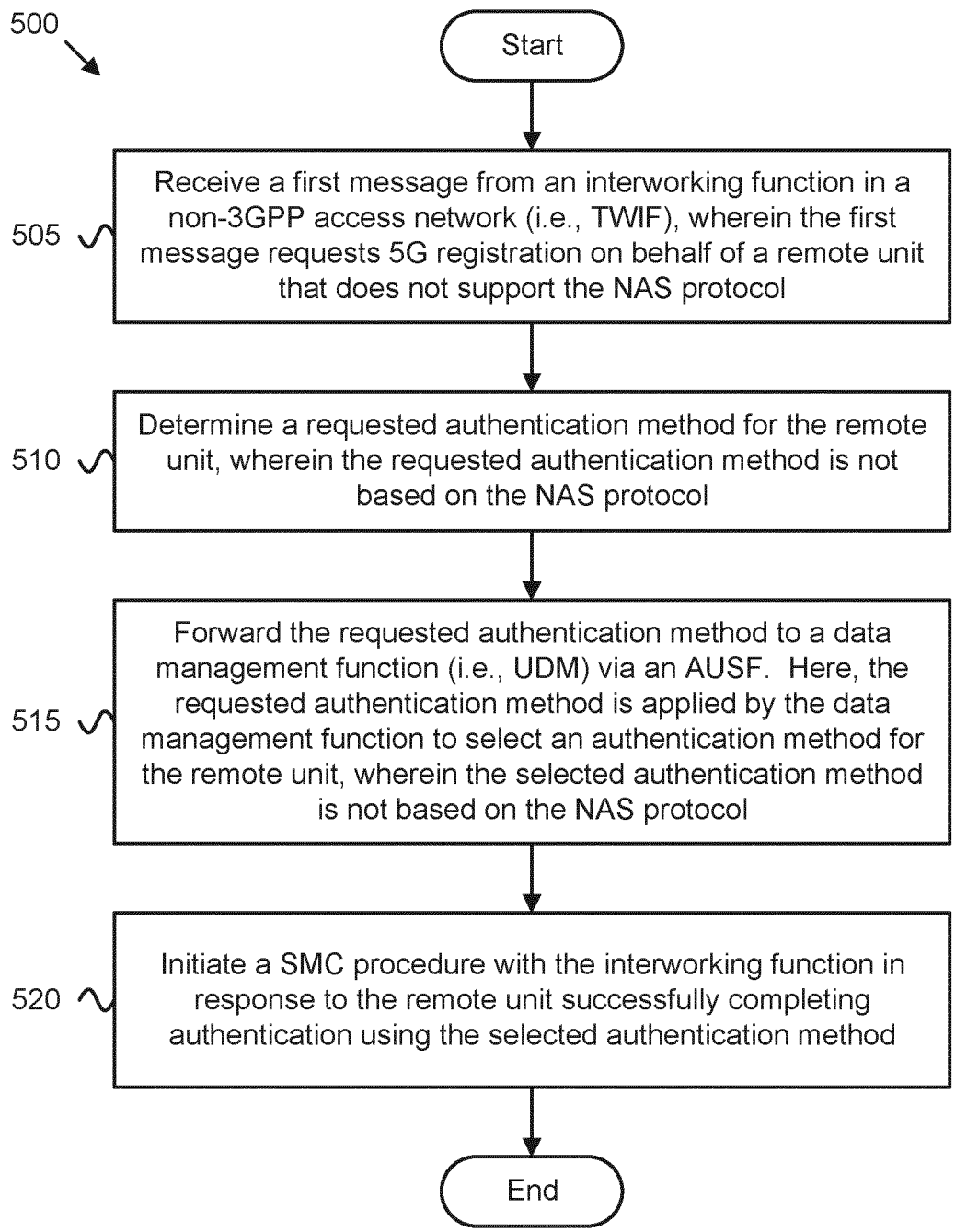
FIG. 5 is a flow chart diagram illustrating one embodiment of a first method for selecting an authentication type in a 5G network.

FIG. 5 depicts one embodiment of a method 500 for selecting an authentication type in a 5G network, according to embodiments of the disclosure. In various embodiments, the method 500 is performed by an access and mobility management function, such as the AMF 143, the AMF 217, and/or the network equipment apparatus 400, described above. In some embodiments, the method 500 is performed by a processor, such as a microcontroller, a microprocessor, a CPU, a GPU, an auxiliary processing unit, a FPGA, or the like.

The method 500 begins and receives 505 a first message from an interworking function in a non-3GPP access network (i.e., TWIF), where the first message requests 5G registration to a mobile communication network on behalf of a remote unit that does not support the NAS protocol.

The method 500 includes determining 510 a requested authentication method for the remote unit, where the requested authentication method is not based on the NAS protocol.

The method 500 includes forwarding 515 the requested authentication method to a data management function (i.e., UDM) via an AUSF in the mobile communication network. Here, the requested authentication method is applied by the data management function to select an authentication method for the remote unit, where the selected authentication method is not based on the NAS protocol.

The method 500 includes initiating 520 a SMC procedure with the interworking function in response to the remote unit successfully completing authentication using the selected authentication method. The method 500 ends.

Figure 6:
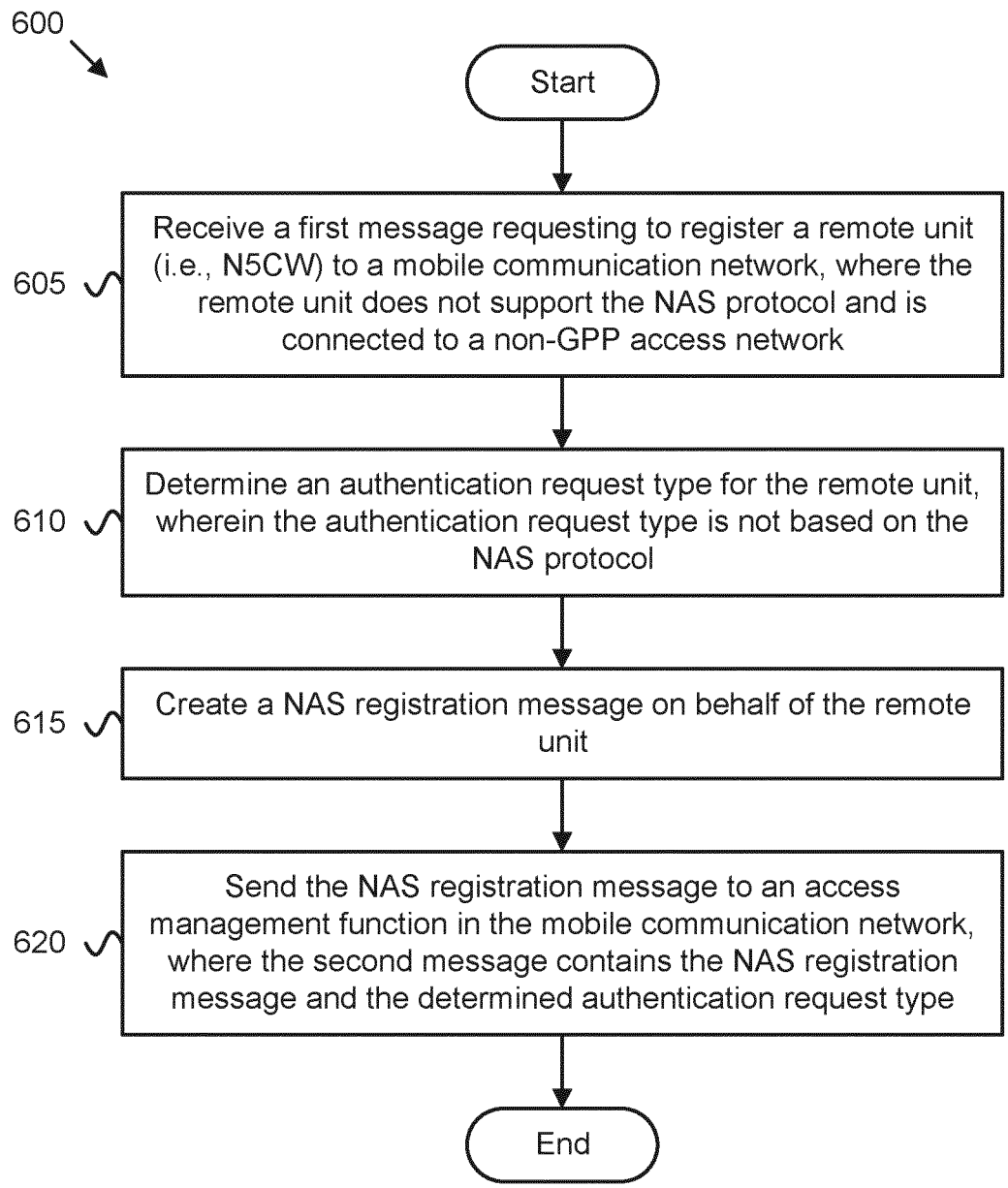
FIG. 6 is a flow chart diagram illustrating one embodiment of a second method for selecting an authentication type in a 5G network.

FIG. 6 depicts one embodiment of a method 600 for selecting an authentication type in a 5G network, according to embodiments of the disclosure. In various embodiments, the method 600 is performed by an interworking function, such as the interworking function 135, the TWIF 213, and/or the network equipment apparatus 400, described above. In some embodiments, the method 600 is performed by a processor, such as a microcontroller, a microprocessor, a CPU, a GPU, an auxiliary processing unit, a FPGA, or the like.

The method 600 begins and receives 605 receiving a first message requesting to register a remote unit to a mobile communication network, where the remote unit is connected to a non-3GPP access network and where the remote unit does not support the NAS protocol. The method 600 includes determining 610 an authentication request type for the remote unit, where the authentication request type is not based on the NAS protocol. The method 600 includes creating 615 a NAS registration message on behalf of the remote unit. The method 600 includes sending 620 a second message to an access management function in the mobile communication network, where the second message contains the NAS registration message and the determined authentication request type. The method 600 ends.

Figure 7:
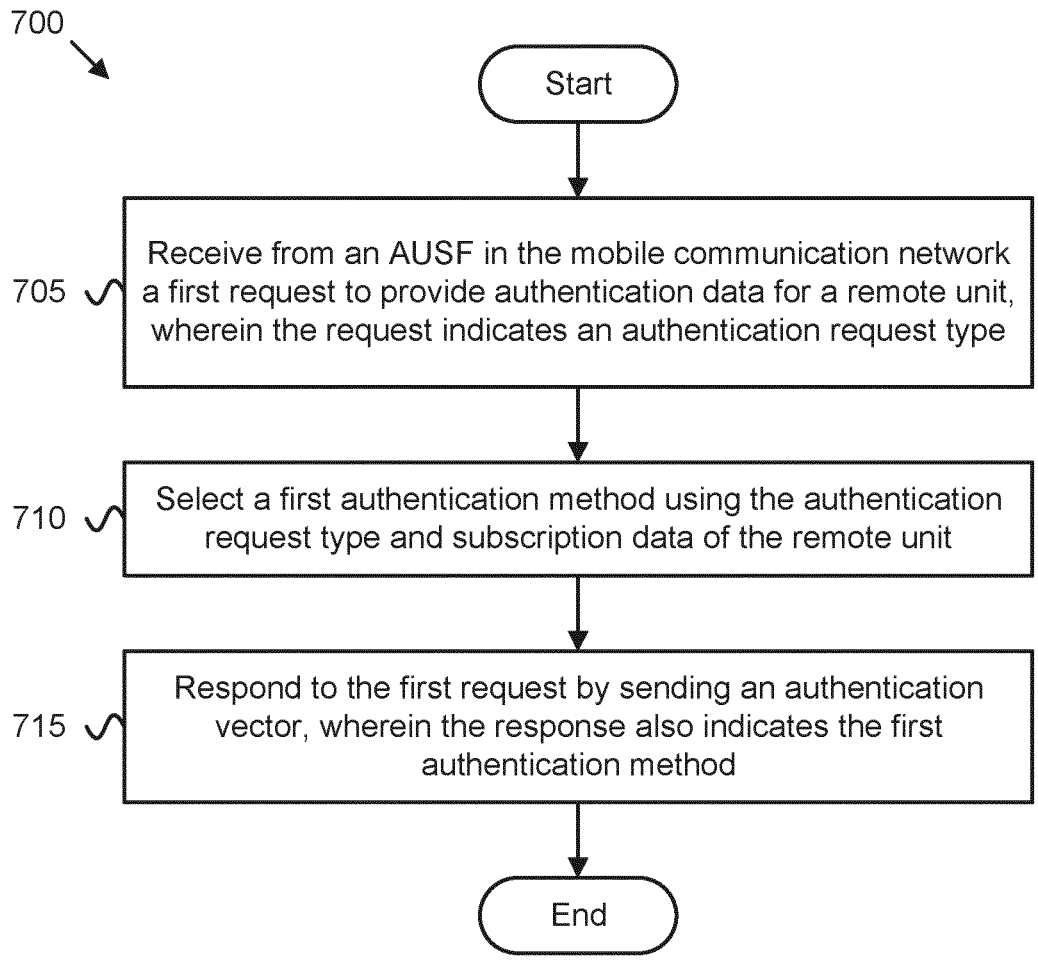
FIG. 7 is a flow chart diagram illustrating one embodiment of a third method for selecting an authentication type in a 5G network.

FIG. 7 depicts one embodiment of a method 700 for selecting an authentication type in a 5G network, according to embodiments of the disclosure. In various embodiments, the method 700 is performed by a subscription and user data manager, such as the UDM/UDR 149, the UDM 219, and/or the network equipment apparatus 400, described above. In some embodiments, the method 700 is performed by a processor, such as a microcontroller, a microprocessor, a CPU, a GPU, an auxiliary processing unit, a FPGA, or the like.

The method 700 begins and receives 705 from an AUSF in a mobile communication network a first request to provide authentication data for a remote unit, where the request indicates an authentication request type. The method 700 includes selecting 710 a first authentication method using the authentication request type and subscription data of the remote unit. The method 700 includes responding 715 to the first request by sending an authentication vector, where the response also indicates the first authentication method. The method 700 ends.

Disclosed herein is a first apparatus for selecting an authentication type in a 5G network, according to embodiments of the disclosure. The first apparatus may be implemented by an access and mobility management function, such as the AMF 143, the AMF 217, and/or the network equipment apparatus 400. The first apparatus includes a processor and a network interface that receives a network interface that receives a first message from an interworking function in a non-3GPP access network (i.e., TWIF), where the first message requests 5G registration to the mobile communication network on behalf of a remote unit that does not support the NAS protocol. The processor determines a requested authentication method for the remote unit, where the requested authentication method is not based on the NAS protocol and forwards the requested authentication method to a data management function (i.e., UDM) via an AUSF in the mobile communication network. Here, the requested authentication method is applied by the data management function to select an authentication method for the remote unit, where the selected authentication method is not based on the NAS protocol. The processor initiates a security mode control procedure with the interworking function in response to the remote unit successfully completing authentication using the selected authentication method.

In some embodiments, the first message is a NGAP message containing a NAS registration request message and an authentication type parameter, where determining the requested authentication method comprises parsing the first message for an authentication type parameter. In some embodiments, determining the requested authentication method comprises selecting a pre-configured authentication method type (i.e., EAP-AKA') whenever the first message is received. In some embodiments, Request message containing the requested authentication method, where the Authentication Request message indicates that the remote unit should be authenticated using an authentication method based on the requested authentication method.

Disclosed herein is a first method for selecting an authentication type in a 5G network, according to embodiments of the disclosure. The first method may be performed by an access and mobility management function, such as the AMF 143, the AMF 217, and/or the network equipment apparatus 400. The first method includes receiving a first message from an interworking function in a non-3GPP access network (i.e., TWIF), where the first message requests 5G registration to a mobile communication network on behalf of a remote unit that does not support the NAS protocol. The first method includes determining a requested authentication method for the remote unit, where the requested authentication method is not based on the NAS protocol and forwarding the requested authentication method to a data management function (i.e., UDM) via an AUSF in the mobile communication network. Here, the requested authentication method is applied by the data management function to select an authentication method for the remote unit, where the selected authentication method is not based on the NAS protocol. The first method includes initiating a security mode control procedure with the interworking function in response to the remote unit successfully completing authentication using the selected authentication method.

In some embodiments, the first message is a NGAP message containing a NAS registration request message and an authentication type parameter, where determining the requested authentication method comprises parsing the first message for an authentication type parameter. In some embodiments, determining the requested authentication method comprises selecting a pre-configured authentication method type (i.e., EAP-AKA') whenever the first message is received. In some embodiments, forwarding the requested authentication method comprises sending to the AUSF an Authentication Request message containing the requested authentication method, where the Authentication Request message indicates that the remote unit is to be authenticated using an authentication method based on the requested authentication method.

Disclosed herein is a second apparatus for selecting an authentication type in a 5G network, according to embodiments of the disclosure. The second apparatus may be implemented by an interworking function, such as the interworking function 135, the TWIF 213, and/or the network equipment apparatus 400. The second apparatus includes a processor and a network interface that receives a first message requesting to register a remote unit to the mobile communication network, where the remote unit is connected to a non-3GPP access network and where the remote unit does not support the NAS protocol. The processor determines an authentication request type for the remote unit, where the authentication request type is not based on the NAS protocol. The processor creates a NAS registration message on behalf of the remote unit and sends a second message to an access management function in the mobile communication network, where the second message contains the NAS registration message and the determined authentication request type.

In some embodiments, the first message comprises a NAI which indicates that the remote unit does not support the NAS protocol, where determining the authentication request type comprises selecting an authentication request type based on the NAI. In certain embodiments, a portion of the NAI indicates an authentication method preferred by the remote unit, where determining the authentication request type is based on the authentication method preferred by the remote unit. In some embodiments, the apparatus is configured with a default authentication method type to use whenever the first message is received.

Disclosed herein is a second method for selecting an authentication type in a 5G network, according to embodiments of the disclosure. The second method may be performed by an interworking function, such as the interworking function 135, the TWIF 213, and/or the network equipment apparatus 400. The second method includes receiving a first message requesting to register a remote unit to a mobile communication network, where the remote unit is connected to a non-3GPP access network and where the remote unit does not support the NAS protocol. The second method includes determining an authentication request type for the remote unit and creating a NAS registration message on behalf of the remote unit. Here, the authentication request type is not based on the NAS protocol. The second method includes sending a second message to an access management function in the mobile communication network, where the second message contains the NAS registration message and the determined authentication request type.

In some embodiments, the first message comprises a NAI which indicates that the remote unit does not support the NAS protocol, where determining the authentication request type comprises selecting an authentication request type based on the NAI. In certain embodiments, a portion of the NAI indicates an authentication method preferred by the remote unit, where determining the authentication request type is based on the authentication method preferred by the remote unit. In some embodiments, the second method includes receiving a configuration of a default authentication method type to use whenever the first message is received.

Disclosed herein is a third apparatus for selecting an authentication type in a 5G network, according to embodiments of the disclosure. The third apparatus may be implemented by a subscription and user data manager, such as the UDM/UDR 149, the UDM 219, and/or the network equipment apparatus 400. The third apparatus includes a processor and a network interface that receives from an AUSF in the mobile communication network a first request to provide authentication data for a remote unit, where the request indicates an authentication request type. The processor selects a first authentication method using the authentication request type and subscription data of the remote unit and responds to the first request by sending an authentication vector, where the response also indicates the first authentication method.

In some embodiments, selecting the first authentication method comprises determining whether the authentication request type is permitted by the subscription data. In some embodiments, the first request includes a SUCI of the remote unit, where the processor decodes the SUCI to retrieve the subscription data of the remote unit.

Disclosed herein is a third method for selecting an authentication type in a 5G network, according to embodiments of the disclosure. The third method may be performed by a subscription and user data manager, such as the UDM/UDR 149, the UDM 219, and/or the network equipment apparatus 400. The third method includes receiving from an AUSF in a mobile communication network a first request to provide authentication data for a remote unit, where the request indicates an authentication request type. The third method includes selecting a first authentication method using the authentication request type and subscription data of the remote unit and responding to the first request by sending an authentication vector, where the response also indicates the first authentication method.

In some embodiments, selecting the first authentication method comprises determining whether the authentication request type is permitted by the subscription data. In some embodiments, the first request includes a SUCI of the remote unit, the method further comprising decoding the SUCI to retrieve the subscription data of the remote unit.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An access and mobility management function ("AMF") in a mobile communication network, the AMF comprising:
   a memory; and
   a processor coupled with the memory and configured to cause the AMF to:
   receive a first message from an interworking function in a non-third generation partnership project ("non-3GPP") access network, wherein the first message requests fifth-generation ("5G") registration to the mobile communication network on behalf of a user equipment ("UE") that does not support a non-access stratum ("NAS") protocol;
   determine an authentication request type for the UE, wherein the authentication request type is not based on the NAS protocol;
   forward the authentication request type to a data management function via an Authentication Server Function ("AUSF") in the mobile communication network, wherein the authentication request type is a basis for a selected authentication method for the UE, wherein the selected authentication method is not based on the NAS protocol; and
   initiate a security mode control procedure with the interworking function in response to the UE successfully completing authentication using the selected authentication method.

2. The AMF of claim 1, wherein the first message is a Next Generation Application Protocol ("NGAP") message containing a NAS registration request message and an authentication type parameter, wherein to determine the authentication request type, the processor is configured to cause the AMF to parse the first message for an authentication type parameter.

3. The AMF of claim 1, wherein to determine the authentication request type, the processor is configured to cause the AMF to select a pre-configured authentication request type whenever the first message is received.

4. The AMF of claim 1, wherein the processor is configured to cause the AMF to transmit to the AUSF an Authentication Request message containing the authentication request type, wherein the Authentication Request message indicates that the UE is to be authenticated using an authentication method based on the authentication request type.

5. An interworking function in a non-third generation partnership project ("non-3GPP") access network, the interworking function comprising:
   a memory; and
   a processor coupled with the memory and configured to cause the interworking function to:
   receive a first message requesting to register a user equipment ("UE") to a mobile communication network, wherein the first message indicates that the UE is connected to a non-3GPP access network and the UE does not support a non-access stratum ("NAS") protocol;
   determine an authentication request type for the UE, wherein the authentication request type is not based on the NAS protocol;
   create a NAS registration message on behalf of the UE; and
   transmit a second message to an access and mobility management function ("AMF") in the mobile communication network, wherein the second message contains the NAS registration message and the determined authentication request type.

6. The interworking function of claim 5, wherein the first message comprises a Network Access Identifier ("NAI") which indicates that the UE does not support the NAS protocol, wherein to determine the authentication request type, the processor is configured to cause the interworking function to select an authentication request type based on the NAI.

7. The interworking function of claim 6, wherein a portion of the NAI indicates an authentication method preferred by the UE, wherein the processor is configured to cause the interworking function to determine the authentication request type is based on the authentication method preferred by the UE.

8. The interworking function of claim 5, wherein the interworking function is configured with a default authentication request type to use whenever the first message is received.

9. A data management function in a mobile communication network, the data management function comprising:
   a memory; and
   a processor coupled with the memory and configured to cause the data management function to:
   receive from an Authentication Server Function ("AUSF") in the mobile communication network a first request to provide authentication data for a user equipment ("UE"), wherein the first request indicates an authentication request type;
   select a first authentication method based on the authentication request type and subscription data of the UE; and
   transmit a response to the first request, wherein the response comprises an authentication vector and an indication of the first authentication method.

10. The data management function of claim 9, wherein to select the first authentication method, the processor is configured to cause the data management function to determine whether the authentication request type is permitted by the subscription data.

11. The data management function of claim 9, wherein the first request includes a subscription concealed identifier ("SUCI") of the UE, wherein the processor is configured to cause the data management function to decode the SUCI and to retrieve the subscription data of the UE based on the decoded SUCI.

* * * * *